US012570071B2

(12) United States Patent
    Ingarao et al.

(10) Patent No.: US 12,570,071 B2
(45) Date of Patent: Mar. 10, 2026

(54) METHOD AND SYSTEM FOR PRODUCING COATED CHIPBOARD HAVING A FUNCTIONAL SURFACE

(71) Applicant: Rheinspan GmbH & Co. KG, Germersheim (DE)

(72) Inventors: Rosario Ingarao, Laichingen (DE); Stefan Kuhn, Harthausen (DE)

(73) Assignee: Rheinspan GmbH & Co. KG, Germersheim (DE)

( * ) Notice: Subject to any disclaimer, the term of this patent is extended or adjusted under 35 U.S.C. 154(b) by 171 days.

(21) Appl. No.: 18/266,297

(22) PCT Filed: Dec. 17, 2021

(86) PCT No.: PCT/EP2021/086449
    § 371 (c)(1),
    (2) Date: Jun. 9, 2023

(87) PCT Pub. No.: WO2022/129497
    PCT Pub. Date: Jun. 23, 2022

(65) Prior Publication Data
    US 2024/0025144 A1     Jan. 25, 2024

(30) Foreign Application Priority Data
    Dec. 18, 2020     (DE) ..................... 10 2020 134 285.3

(51) Int. Cl.
    *B32B 5/24*         (2006.01)
    *B32B 37/00*        (2006.01)
    (Continued)

(52) U.S. Cl.
    CPC ........... *B32B 5/24* (2013.01); *B32B 37/0053* (2013.01); *B32B 37/025* (2013.01); *B32B 37/06* (2013.01);
    (Continued)

(58) Field of Classification Search
    CPC .............................. B32B 37/025; B32B 37/26
    (Continued)

(56) References Cited

U.S. PATENT DOCUMENTS 5,422,168 A * 6/1995 O'Dell ...................... B32B 7/04
                                                            428/326
2005/0229517 A1* 10/2005 Gomez Insa ........... E04F 15/02
                                                            52/393
(Continued)

FOREIGN PATENT DOCUMENTS

DE          4221611 A1      1/1994
DE      102009032153      *  1/2011 ............. B32B 21/06
(Continued)

OTHER PUBLICATIONS

English Abstract of EP0573676, Dec. 15, 1993.
(Continued)

*Primary Examiner* — Nahida Sultana
(74) *Attorney, Agent, or Firm* — CAHN & SAMUELS, LLP

(57)                ABSTRACT

A method for producing coated chipboard (9) having a functional surface, wherein the chipboard (9), in a first step (S1), is covered continuously and simultaneously and on both sides using melamine-impregnated paper (90) and a functional carrier material (91), wherein the melamine-impregnated paper (90) and the functional carrier material (91) are laid continuously and simultaneously by two rolls (10) and (11) in each case on the chipboard (9). A system for carrying out the above method and for producing a coated chipboard (9) includes, for continuously operating the system and for continuously carrying out the method, in each case a suitable functional carrier material and paper unwind-
(Continued)

1 ing device (1), a suitable cutting device (2), a suitable press (3), and a suitable functional carrier material draw-off device (4).

13 Claims, 2 Drawing Sheets

(51) Int. Cl.

| | | |
|---|---|---|
| *B32B 37/06* | (2006.01) | |
| *B32B 37/26* | (2006.01) | |
| *B32B 38/00* | (2006.01) | |
| *B32B 38/06* | (2006.01) | |
| *B32B 38/18* | (2006.01) | |
| *B32B 41/00* | (2006.01) | |

(52) U.S. Cl.
  CPC ............ *B32B 37/085* (2013.01); *B32B 37/26* (2013.01); *B32B 38/0004* (2013.01); *B32B 38/06* (2013.01); *B32B 38/18* (2013.01); *B32B 41/00* (2013.01); *B32B 2260/021* (2013.01); *B32B 2260/046* (2013.01); *B32B 2307/7376* (2023.05)

(58) Field of Classification Search
  USPC .......................................... 156/230, 60, 62.2
  See application file for complete search history.

(56) References Cited

U.S. PATENT DOCUMENTS

| | | | | |
|---|---|---|---|---|
| 2007/0207296 A1* | 9/2007 | Eisermann | ................ | B44C 1/00 |
| | | | | 428/200 |
| 2010/0297434 A1* | 11/2010 | Iversen | ................... | E04F 15/10 |
| | | | | 977/773 |
| 2010/0300030 A1 | 12/2010 | Pervan et al. | | |
| 2011/0135849 A1* | 6/2011 | Kruesemann | ........... | B32B 15/04 |
| | | | | 428/196 |
| 2013/0333182 A1* | 12/2013 | Pervan | ...................... | B27F 1/02 |
| | | | | 29/426.3 |
| 2016/0001323 A1* | 1/2016 | Thole | ..................... | B32B 21/10 |
| | | | | 427/393 |
| 2020/0101710 A1* | 4/2020 | Clausi | ..................... | B32B 21/02 |

FOREIGN PATENT DOCUMENTS

| | | | |
|---|---|---|---|
| DE | 102009032153 A1 | 1/2011 | |
| DE | 102018005880 A1 | 1/2020 | |
| EP | 0573676 | 12/1993 | |

OTHER PUBLICATIONS

English Abstract of DE4221611A1, Jan. 5, 1994.
PCT Translation of International Preliminary Report on Patentability, PCT/EP2021/086449, dated Jun. 29, 2023, 10 pages.

* cited by examiner

METHOD AND SYSTEM FOR PRODUCING COATED CHIPBOARD HAVING A FUNCTIONAL SURFACE

This patent application is a U.S. national stage application of PCT international application PCT/EP2021/086449 filed on 17 Dec. 2021 and claims priority of German patent document 10 2020 134 285.3 filed on 18 Dec. 2020, the entireties of which are incorporated herein by reference.

AREA OF THE INVENTION

The invention relates to a method for producing functionally coated chipboard having a functional surface and a system for this purpose. The invention relates in particular to a method and a system for producing raw chipboard covered with melamine-impregnated coating papers or resin-coated melamine films.

PRIOR ART

In many technical fields, for example in the construction or furniture industry, fiberboard and chipboard are used to solve a variety of construction problems. They are used, for example, as insulation boards, as furniture or kitchen fronts, or the like. To increase the durability or resistance of such boards and to provide a surface of a board with a decoration, coating these boards using a suitable coating is known from practice. A coating based on plastics can increase the durability and resistance and, for example, form a waterproof coating, and also enable a colored and possibly also three-dimensionally structured decorative appearance.

Further coated chipboards known from the prior art have raw chipboards as carriers, which are covered by melamine-impregnated coating papers, in particular resin-coated melamine films. Such coatings are used in particular in highly-stressed work-pieces, such as kitchen workspaces or particularly stressed furniture fronts, but also in the production of laminate floors. During the coating using melamine formaldehyde resin, a conventional, digitally printed or also plain decorative paper is impregnated using a melamine formaldehyde resin, dried, and pre-condensed. The decorative paper thus treated is compressed as a film with chipboard in the short-cycle pressing method using a hot press.

The resin-coated melamine film bonds during the melamine short-cycle pressing with the chipboard due to pressure and temperature, wherein greatly varying types of decorative melamine films, such as plain, wood-stone reproductions, etc. can be used. After the pressing procedure, the surface of the chipboard can be processed without further coating processes.

In the coating of chipboards known from the prior art, the covering of the chipboards with resin-coated melamine film takes place in the static process. A previously trimmed sheet of melamine-impregnated coating paper is laid on the chipboards before the pressing. Such multistep methods therefore require a corresponding large number of work steps matched with one another and are thus accordingly complex and time-consuming, in particular for producing coated chipboard of desirable quality.

This is the case in particular in the method using so-called short-cycle presses, which is known as short-cycle melamine coating. Printed and resin-coated papers in the form of sheets are applied to a carrier plate here, which is then compressed in a short-cycle press. This is relevant in particular if the press contains an embossing plate, which in turn contains an embossing structure that is made visually matching with the printed image on the paper sheet. In this case, it is important for the printed paper sheet to be aligned with high accuracy in relation to the plate front edge. However, it is disadvantageously technically complex in particular to first process decoratively printed papers from rolled products to form sheet products, i.e., to cut them, in order to then lay them as individual leaves, namely sheets on chipboards, align them correctly in relation to the embossing plate, and subsequently compress them.

A method for producing a laminate composite board is known from DE 10 2009 032 153 A1, in which the following steps are carried out: providing a plurality of first cellulose fiber webs provided with an impregnation; providing a plurality of second cellulose fiber webs provided with an impregnation; providing a wooden material board; forming a laminate having an upper cover layer containing the first cellulose fiber webs, having a middle layer, adjoining the upper cover layer with its upper side, containing the wooden material board, and having a lower cover layer, adjoining the lower side of the middle layer, containing the second cellulose fiber webs. The upper cover layer and/or the lower cover layer are formed so that they have a thickness of at least 2 mm after the step of moving out of the hot press. Finally, the laminate is introduced into a hot press and compressed to form a composite board while increasing the press pressure and the temperature, and the composite board is moved out of the hot press. The known method is carried out using double-belt presses and is restricted to the production of laminate composite boards having a thickness of at most 18 mm.

The object of the invention is accordingly to provide a cost-effective, efficient method for producing high-quality coated chipboard, also having a printed, also structured decoration, and also having a functional surface. It is a further object of the invention to specify a system suitable for carrying out the method.

This object is achieved by the invention by the features of the independent claim. Advantageous refinements of the invention are characterized in the dependent claims. The wording of all claims is hereby made the content of this description by reference. The invention also comprises all reasonable and in particular all mentioned combinations of independent and/or dependent claims.

Individual method steps are described in more detail hereinafter. The steps do not necessarily have to be carried out in the specified sequence, and the method to be described can also include further steps which are not mentioned.

SUMMARY OF INVENTION

The invention relates in particular to a method for producing coated chipboard, wherein the chipboard is provided with a functional surface.

Chipboards are produced from small pieces of wood, which are referred to as chips, and binders (DIN EN 309). The thickness of a chipboard is typically in the range of 8 mm to 40 mm. Extra-thin so-called thin chipboards can have a thickness of 2.5 mm and extra-thick chipboards can have a thickness of 80 mm. The method according to the invention for producing coated chipboard having a functional surface is suitable in particular for chipboard having a thickness of 8 mm to 80 mm and preferably 8 mm to mm. This also applies to the system used to carry out the method.

The invention relates in particular to a method for producing coated chipboard, wherein the chipboard is provided with a functional surface, wherein the chipboard is covered in a first stab continuously and simultaneously on both sides using melamine-impregnated paper and a functional carrier material, wherein the melamine-impregnated paper and the functional carrier material are laid continuously and simultaneously on the chipboard from two rolls in each case. The advantageous simultaneous laying of melamine-impregnated paper and functional carrier material also enables a particularly efficient method for producing decoratively printed surfaces of coated chipboards. The functional carrier material can in particular be a transfer lacquer carrier or an overlay, which can be provided by means of a treated, usually transparent material layer, which binds to the melamine film in the short-cycle procedure or pressing procedure.

A paper having a thickness of 40 to 350 g/m² is suitably selected as the paper and a functional carrier material having a thickness of 50 to 280 g/m² is suitably selected as the functional carrier material, so that a coating with a chipboard with a functional surface of 8 mm to 50 mm is provided.

The functional carrier material is capable of providing functional surfaces by suitable selection of the coating material, which in particular has at least one of the following properties, namely scratch proof, abrasion resistant, nonslip, water repellent, stain resistant, also having anti-fingerprint properties, antibacterial, and antimicrobial, wherein such functional surfaces can additionally have various matte and gloss levels.

In a suitable manner, the paper and the functional carrier material can each be laid from suitable rolls on the chipboard in the first step, wherein the paper and the functional carrier material can be subjected to the pressure on the chipboard by means of two rollers and prefixed on the chipboard. The paper, which is advantageously continuously laid from the rolls, and the functional carrier material do not have to be trimmed into sheets in this case. In addition, a continuous feed of the covered chipboard in the production direction can be exerted in this case by means of the rollers, wherein the rollers have an advantageous double function.

The covering with the coating paper and the functional carrier material can in a second step be trimmed jointly and at the same time suitably by means of laser cutting technology. This measure also enables the method to be carried out particularly efficiently, because complex positioning, in particular of covering materials trimmed separately from one another, is omitted.

In a third step of the method, by means of a short-cycle hot pressing method, the functional material can be transferred onto the melamine-impregnated coating paper of the covered chipboard, wherein a final functional surface of the coated chipboard is provided by means of an advantageous direct coating, the surface properties or functions of which are provided from the composite of the chipboard, the melamine-impregnated coating paper, and the functional material. The functional material can additionally be embossed in a suitable manner during the hot pressing method by means of structuring plates in this case, so that a predetermined surface structuring can additionally be provided. The coating paper and the functional carrier material are fixed on the chipboard by static charge.

In a fourth step of the method, the functional carrier material can be continuously drawn off from the directly-coated chipboard. The drawn-off functional carrier material can be continuously wound onto rolls in a simple manner in this case. This measure in particular also enables, together with the continuous joint laying of the functional carrier material and the coating paper, the continuous performance of these steps and also further steps of the method.

A system for producing coated chipboard having a functional surface is suitably used to carry out the method, wherein the system in each case includes a functional carrier material and paper unwinding device suitable for continuously carrying out the method, a suitable cutting device, and a suitable press.

The above system can suitably additionally include a functional carrier material draw-off device, a quality checking device, a protective film device, a dividing device, and a stacking device, so that following the fourth step, the coated chipboard can be subjected to a visual quality check in a fifth step of the method. Subsequently thereto, the coated chipboard can be provided in a sixth step of the method on both sides with an additional protective film, so that its freshly coated surface is advantageously protected. In a seventh step, the coated and protected board can also be divided multiple times in a dividing device. Finally, the coated chipboard with its protected surfaces can be stacked in a stacking device in an eighth step of the method.

The above system can furthermore include a suitable transport device for the transport of the chipboard in the production direction of the system. Advantageous continuous and efficient performance of the method is also promoted by this measure.

Steps 1-8 are suitably executed independently of one another, the first, second, third, and fourth steps are executed continuously in succession, wherein multiple chipboards can be treated in succession and simultaneously in the system by means of the method.

In this case, the fifth, sixth, seventh, and eighth step can additionally also be executed continuously, so that advantageously multiple chipboards can be treated continuously in succession and simultaneously in the overall system by means of the method.

The system can particularly suitably be continuously operated cyclically, wherein a supply of chipboards into the functional carrier material and paper unwinding device of the system can also be carried out continuously. For this purpose, the system can include a suitable controller for the suitably cyclic, continuous performance, which is matched to one another, of the first, second, third, fourth, fifth, sixth, seventh, and eighth step of the method and for the operation of the transport device.

The present invention accordingly additionally relates to a system for producing coated chipboard and for carrying out the above-described method, wherein the system includes in each case a suitable functional carrier material and paper unwinding device, a suitable cutting device, and a suitable press for the continuous operation of the system and for the continuous performance of the method.

In addition, the system can additionally include in each case a suitable functional carrier material draw-off device, a suitable quality checking device, a suitable protective film device, a suitable dividing device, and a suitable stacking device for the continuous operation of the system and for the continuous performance of the method. In this case, the system can additionally include a suitable controller for its cyclic operation suitable for carrying out the method.

Further details and features of the above-described method and the above-described system result from the following description of preferred exemplary embodiments in conjunction with the dependent claims. In this case, the respective features can be implemented alone or in multiples in combination with one another. The possibilities for solving the problem are not restricted to the exemplary embodiments.

The exemplary embodiments are schematically shown in the figures. Identical reference signs in the individual figures designate identical or functionally identical elements or elements corresponding to one another with respect to their function. For the sake of clarity, not all identical or functionally identical elements are provided with reference signs.

BRIEF DESCRIPTION OF THE DRAWINGS

IN THE SPECIFIC FIGURES

FIG. 1A and

Figures 2A, 2B:
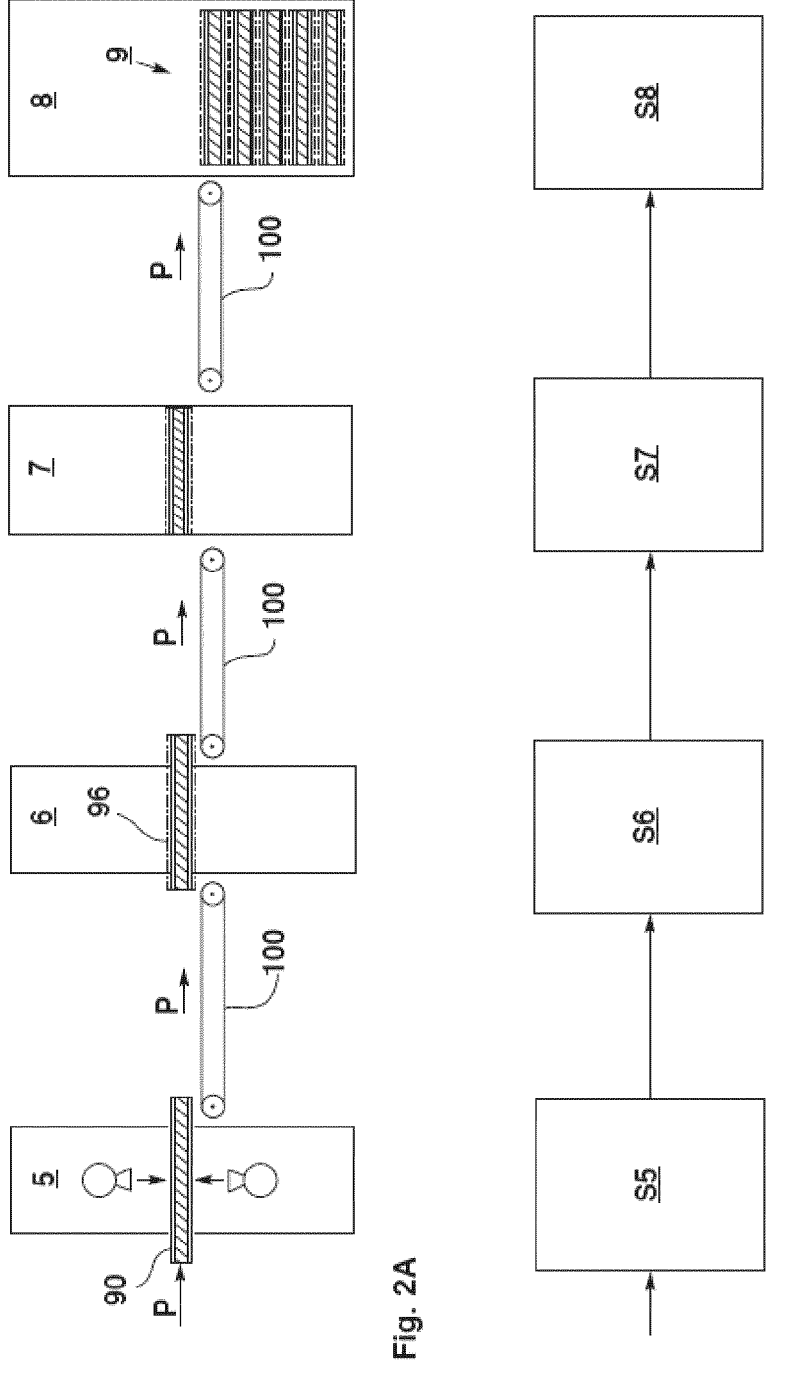

FIG. 2A show devices of a system for producing coated chipboard having a functional surface according to one embodiment of the invention; and

FIG. 1B and

FIG. 2B show a flow chart of steps of a method for producing coated chipboard having a functional surface according to one embodiment of the invention.

DETAILED DESCRIPTION OF THE INVENTION

Figures 1A, 1B:
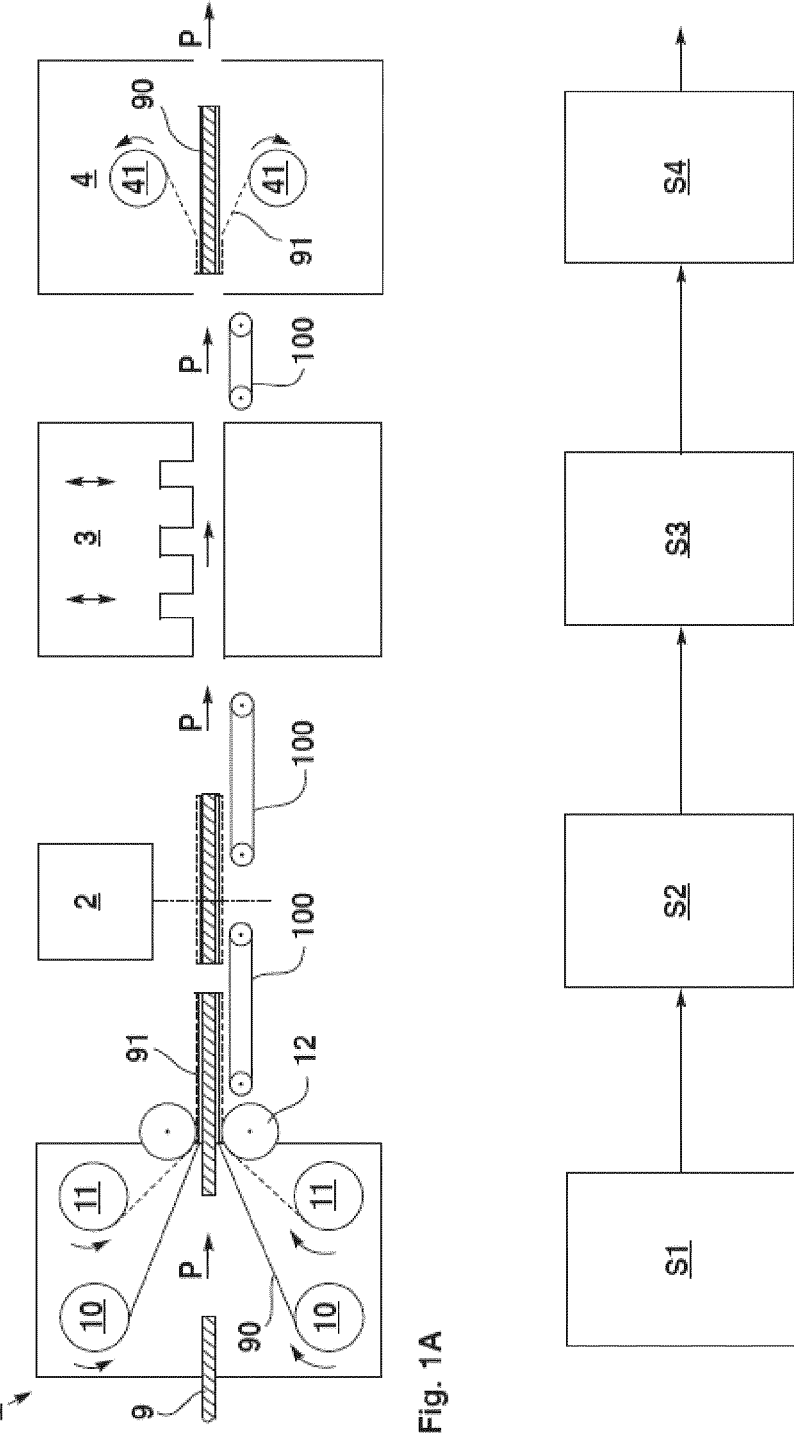

FIGS. 1A and 2A show a schematic illustration of a system for producing coated chipboard 9 having a functional surface according to one embodiment of the invention having a transfer lacquer carrier and paper unwinding device 1, a cutting device 2, a press 3, a functional carrier material draw-off device 4, a quality checking device 5, a protective film device 6, a dividing device 7, and a stacking device 8, which is suitably (but not necessarily) arranged in succession in this sequence, and wherein a transport device 100 can suitably be provided for the transport of the chipboard 1 in the production direction P between the mentioned devices.

FIGS. 1B and 2B show a flow chart of steps S1 to S8 of a method for producing coated chipboard 9 having a functional surface according to one embodiment of the invention, wherein steps S1, S2, S3, S4, S5, S6, S7, and S8 are suitably executed in succession in this sequence, and in each case correspond to the functional carrier material and paper unwinding device 1, the cutting device 2, the press 3, the functional carrier material draw-off device 4, the quality checking device 5, the protective film device 6, the dividing device 7, and the stacking device 8. The drawings, corresponding to one another, FIG. 1A of the system and FIG. 1B of the method or FIG. 2A of the system and FIG. 2B of the method, respectively, are also each shown together on a drawing sheet 1/2 and 2/2 for better understanding.

The functional carrier material and paper unwinding device 1 includes two rolls 10 for continuously covering the chipboard 9 on both sides with melamine-impregnated paper 90. The paper 90 is laid by the rolls 10 on the chipboard 9. An additional functional carrier material is also laid on both sides on the chipboard 9 by means of a functional carrier material 91. For this purpose, the functional carrier material and paper unwinding device 1 includes two further rolls 11, from which the functional carrier material 91 is supplied to the chipboard 9 and at the same time is laid on both sides in each case on the coating paper 90.

At the outlet of the functional carrier material and paper unwinding device 1, two rollers 12 are provided on both sides of the chipboard 9 covered on both sides with the melamine-impregnated coating paper 90 and the functional carrier material 91, which rollers exert a predetermined two-sided pressure on the covered chipboard 9 and at the same time prefix the coating paper 90 and the functional carrier material 91 on the chipboard 9. In addition, a feed of the covered chipboard 9 in the production direction P is provided by means of a rotation of the rollers 12.

Following the functional carrier material and paper unwinding device 1, the covered chipboard 9 is supplied by means of the transport device 100 to a cutting device 2, by means of which the covering of the chipboard 9, namely the coating paper 90 and the functional carrier material 91, is trimmed to its predetermined dimensions in a second step S2 of the method described hereinafter.

Following the cutting device 2, the cover of the chipboard is statically charged and supplied together with the chipboard 9 by means of the transport device 100 to a press 3, which is configured in such a way that the functional carrier material is transferable from the functional carrier material 91 to the melamine-impregnated coating paper 90 by means of a short-cycle hot pressing method. In this case, cross-linking of the functional carrier material with the melamine-impregnated coating paper 90 occurs, after which the final surface of the directly coated chipboard 9 is provided. The surface properties or functions of this direct coating result from the composite of the chipboard 9, the melamine-impregnated coating paper 90, and the functional material. The press 3 can additionally include structuring plates and can be configured in this case in such a way that the functional carrier material is embossed during the hot pressing procedure by means of the structuring plates, so that it has a predetermined surface structuring.

The surface structuring can be made decoratively predetermined by the use of various structuring plates. The structuring plates (not shown in the drawing) are arranged in the press 3 in each case on both sides above and below the covered chipboard 9. The press 3 as described above is accordingly configured in such a way that the covered chipboard 9 can be permanently coated using the melamine-impregnated coating paper 90 in the press 3 in a third step S3 of the method described hereinafter, which paper can be decorated at the same time by means of the functional carrier material 91 and optionally provided with a surface structuring by means of the structuring plates.

Following the hot pressing method having the pressing procedure in the press 3 and the discharge of the coated chipboard 9 from the press 3, the coated and possibly decorated and structured chipboard 9 is supplied by means of the transport device 100 to a functional carrier material draw-off device 4. The functional carrier material draw-off device 4 is configured here in such a way that the functional carrier material 91, in a fourth step S4 of the method described hereinafter, can be removed, also in the continuous process, from the chipboard 9 directly coated using the melamine-impregnated coating paper 90. For this purpose, rolls 41 for continuously winding up the drawn-off functional carrier material 91 are suitably provided in the functional carrier material draw-off device 4.

Following the functional carrier material draw-off device 4, the coated chipboard 9 is supplied by means of the transport device 100 to a quality check, which is suitably configured in such a way that the coated chipboard 9 is subjected in a suitable manner to a visual quality check in a fifth step S5 of the method described hereinafter.

Following the quality checking device 5, the coated chipboard 9 can be supplied by means of the transport device 100 to a protective film device 6, in which the coated chipboard 9 can be protected by means of an additional protective film 96 in a sixth step S6 of the method described hereinafter.

At the end of the system for producing coated chipboard 9, the chipboard 9, which is coated using the melamine-impregnated coating paper 90 and decorated and possibly structured, is supplied by means of the transport device 100 to an optional dividing system 7 and also divided multiple times therein. The chipboards 9 are then supplied to a stacking device 8 and stacked in an eighth step S8 of the method described hereinafter.

FIGS. 1B and 2B show, as mentioned above, a flow chart of steps S1 to S8 of a method for producing coated chipboard 9 having a functional surface according to an embodiment of the invention, wherein steps S1, S2, S3, S4, S5, S6, S7, and S8 are suitably executed in this sequence in succession, and respectively correspond here to the functional carrier material and paper unwinding device 1, the cutting device 2, the press 3, the transfer lacquer carrier draw-off device 4, the quality checking device 5, a protective film device 6, the dividing device 7, and the stacking device 8.

In step S1 of the method for producing coated chipboard 9 having a functional surface, the chipboard 9 is advantageously covered continuously and simultaneously on both sides using melamine-impregnated paper 90 and a functional carrier material 91, wherein the melamine-impregnated paper 90 and the functional carrier material 91 are suitably laid continuously and simultaneously from two rolls 10 and 11 in each case on the chipboard 9. The paper 90 is laid by the rolls 10 on the chipboard 9 and the functional carrier material 91 is laid by the rolls 11 on the chipboard 8. The paper 90 and the transfer lacquer carrier 91 on the chipboard 9 are suitably subjected to pressure here by means of two rollers 12 and in this way pre-fixed on the chipboard 9, wherein in addition a continuous feed of the covered chipboard 9 in the production direction P is exerted by means of the rollers 12.

In step S2 of the method, the covering of the covered chipboard 9, namely the coating paper 90 and the functional carrier material 91, are jointly trimmed in a step and then the covering is statically charged.

In step S3 of the method, the functional carrier is transferred from the functional carrier material 91 by means of a short-cycle hot pressing method to the melamine-impregnated coating paper 90, wherein cross-linking of the functional carrier with the melamine-impregnated coating paper 90 takes place, so that a final functional surface of the directly-coated chipboard 9 is provided. In step S3, an advantageous direct coating is carried out, the surface properties or functions of which are provided from the composite of the chipboard 9, the melamine-impregnated coating paper 90, and the functional carrier. In step S3, the functional surface can additionally be embossed during the hot pressing method by means of structuring plates, so that a predetermined surface structuring can be provided.

In step S4 of the method, the functional carrier material 91 on the coated and possibly decorated and structured chipboard 9 is removed, also in an advantageously continuous process, from the chipboard 9 directly coated using the melamine-impregnated coating paper 90, wherein the drawn-off functional carrier material 91 is suitably continuously wound onto rolls 41 and dis-charged from the process. The functional carrier material is supplied to the recycling here via suitable shredding.

In step S5 of the method, the coated and possibly decorated and structured chipboard 9 can be suitably subjected to a visual quality check.

In step S6 of the method, the coated chipboard 9 can be provided and protected by means of an additional protective film 96, wherein the protective film 96 is applied on both sides to the surface of the chipboard 9.

In step S7, the coated chipboard 9 can be divided multiple times and then in a further step S8 of the method it can be stacked in a stacking device 8.

Preceding steps S1 to S8 are suitably carried out in succession, wherein to provide the most continuous method possible, a system described above with reference to FIGS. 1A and 2A is suitably used, and wherein the chipboard 9 is advantageously transported in the system by means of a transport device 100 to the devices of the system, in which steps S1 to S8 are respectively carried out.

In the method for producing coated chipboard 9 according to one embodiment of the invention, at least particularly advantageous steps S1 to S4 and suitably steps S1 to S8 are continuously executed. For this purpose, the system having its above-described devices 1 to 8 and also the transport device 100 is suitably continuously operated cyclically. It is clear that a supply of chipboards 9 into the functional carrier material and paper unwinding device 1 of the system is also continuously carried out here, and the system includes a suitable controller for the suitable cyclic, continuous control, which is matched to one another, of its above-described devices for carrying out steps S1 to S8 of the method and the transport device 100.

Numerous modifications and refinements of the described exemplary embodiments are implementable.

REFERENCE SIGNS 1 functional carrier material and paper unwinding device
10 roll
11 roll
12 roller
S1 step
2 cutting device
S2 step
3 press
S3 step
4 functional carrier material draw-off device
41 roll
S4 step
5 quality checking device
S5 step
6 protective film device
S6 step
7 dividing device
S7 step
8 stacking device
S8 step
9 chipboard
90 paper, coating paper
91 functional carrier material
96 protective film
100 transport device
P production direction

The invention claimed is:

1. A method for producing continuously coated chipboard having a functional surface,
    wherein a chipboard, in a first step, is covered continuously and simultaneously and on both sides using melamine-impregnated coating paper and a functional carrier material;
    wherein in the first step, the melamine-impregnated coating paper and the functional carrier material are laid continuously and simultaneously by two laying rolls and in each case on the chipboard, wherein the functional carrier material is a transfer lacquer carrier or an overlay;

wherein in the first step, the melamine-impregnated coating paper and the functional carrier material are continuously subjected to pressure on the chipboard by two pressure and feeding rollers and are prefixed on the chipboard, and a continuous feed of the covered chipboard in a production direction is exerted at the same time by the pressure and feeding rollers;

wherein in a second step, the coating with the melamine-impregnated coating paper and the functional carrier material are trimmed jointly and at the same time by laser cutting technology and are subsequently statically charged, whereby the melamine-impregnated coating paper and the functional carrier material are fixed on the chipboard by static charge; and wherein in a third step, a functional material is transferred from the functional carrier material to the melamine-impregnated coating paper of the covered chipboard by a short-cycle hot pressing method, wherein cross-linking of the functional carrier material with the melamine-impregnated coating paper occurs, after which a final functional surface of the chipboard is provided by a direct coating, surface properties or functions of which are provided from the composite of the chipboard, the melamine-impregnated coating paper, and the functional material.

2. The method as claimed in claim 1, wherein the functional surface is additionally embossed by structuring plates during the hot pressing method, so that a predetermined surface structuring is provided.

3. The method as claimed in claim 1, wherein in a fourth step, the functional carrier material is continuously drawn off from the chipboard directly coated using the melamine-impregnated coating paper, wherein the drawn-off functional carrier material is continuously wound onto winding up rollers, wherein the functional carrier material is supplied via shredding to recycling immediately after it is drawn off.

4. The method as claimed in claim 1, wherein a system for producing coated chipboard is used, wherein the system includes a functional carrier material and paper unwinding device, a cutting device, a press, and a functional carrier material draw-off device.

5. The method as claimed in claim 4, wherein the system additionally includes a quality checking device, a protective film device, a dividing device, and a stacking device;

wherein the coated chipboard is subjected in a fifth step to a visual quality check; and wherein the coated chipboard, in a sixth step, is provided and protected on both sides using an additional protective film;

wherein the coated and protected chipboard is divided multiple times in a seventh step; and wherein the coated chipboard is stacked in a stacking device in an eighth step.

6. The method as claimed in claim 4, wherein the system includes a transport device to transport the chipboard in the production direction of the system.

7. The method as claimed in claim 5, wherein the first, second, third, and fourth step are continuously executed, wherein the chipboards can be treated in succession simultaneously in the system by the method, wherein in addition the fifth, sixth, seventh, and eighth step can be continuously executed and in this case the chipboards can be treated in parallel in the system by the method.

8. The method as claimed in claim 7, wherein the system is continuously operated cyclically, wherein a supply of chipboards into the functional carrier material and paper unwinding device of the system is also carried out continuously, and wherein the system includes a suitable controller for the suitably cyclic, continuous performance, which is matched to one another, of steps one to eight and the transport device.

9. The method as claimed in claim 1, wherein a coating material of the functional carrier material has at least one of scratch proof, abrasion resistant, anti-slip, water repellent, stain resistant, anti-fingerprint properties, antibacterial, or antimicrobial properties.

10. The method as claimed in claim 1, wherein a chipboard having a thickness of 8 mm to 80 mm is coated.

11. A system for producing continuously coated chipboard having a functional surface and for carrying out the method as claimed in claim 1, comprising:

a functional carrier material and paper unwinding device;

a cutting device;

a press;

a functional carrier material draw-off device;

a quality checking device;

a protective film device;

a dividing device;

a stacking device; and a controller for its cyclic operation for carrying out the method.

12. The method as claimed in claim 1, wherein a coating material of the functional carrier material has a matte or gloss level.

13. A method for producing continuously coated chipboard having a functional surface, comprising:

continuously and simultaneously covering a chipboard on both sides with a melamine-impregnated coating paper and a functional carrier material, wherein the melamine-impregnated coating paper and the functional carrier material are laid continuously and simultaneously by two laying rolls in each case on the chipboard, and wherein the functional carrier material comprises a transfer lacquer carrier or an overlay;

continuously subjecting the covered chipboard to a predetermined pressure by two pressure and feeding rollers, one roller of which on each side of the covered chipboard, thereby prefixing the melamine-impregnated coating paper and the functional carrier material on both sides of the chipboard;

continuously feeding the covered chipboard in a production direction by the two pressure and feeding rollers;

jointly trimming the coating with the melamine-impregnated coating paper and the functional carrier material by laser cutting;

statically charging the coating with the melamine-impregnated coating paper and the functional carrier material, whereby the melamine-impregnated coating paper and the functional carrier material are fixed on the chipboard by static charge; and transferring a functional material from the functional carrier material to the melamine-impregnated coating paper of the covered chipboard by short-cycle hot pressing, wherein cross-linking of the functional carrier material with the melamine-impregnated coating paper occurs, thereby providing a final functional surface of the chipboard.

* * * * *